W. M. NECKERMAN.
PIPE TRANSFERRING APPARATUS.
APPLICATION FILED APR. 2, 1914.
1,126,833.
Patented Feb. 2, 1915.
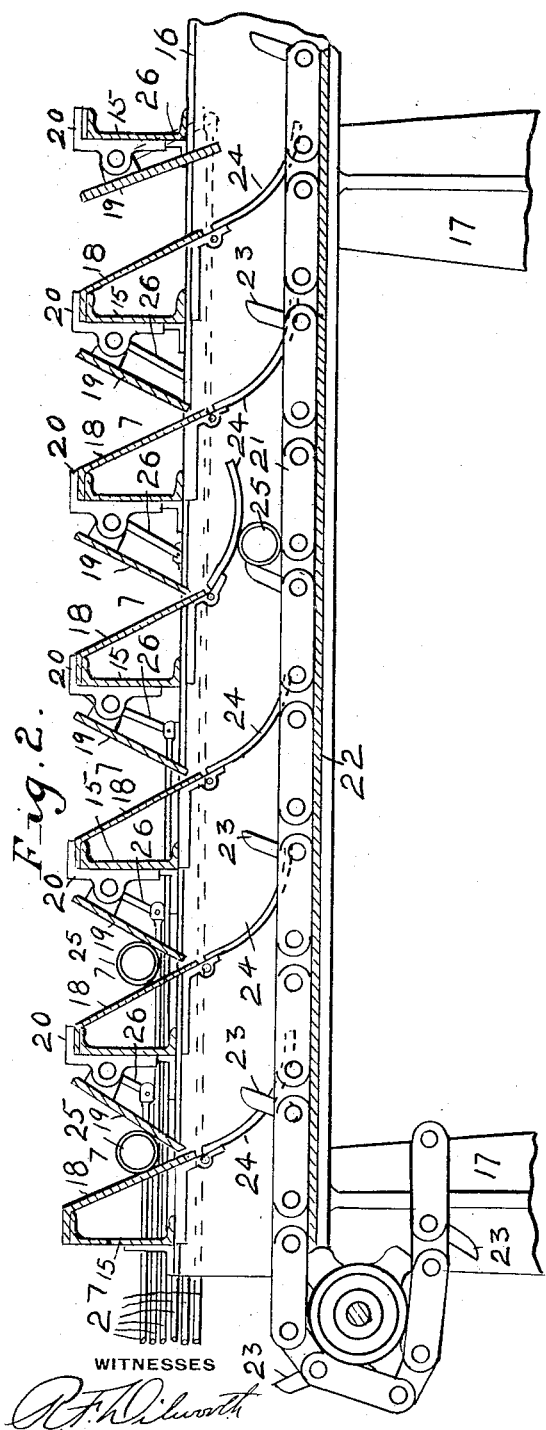
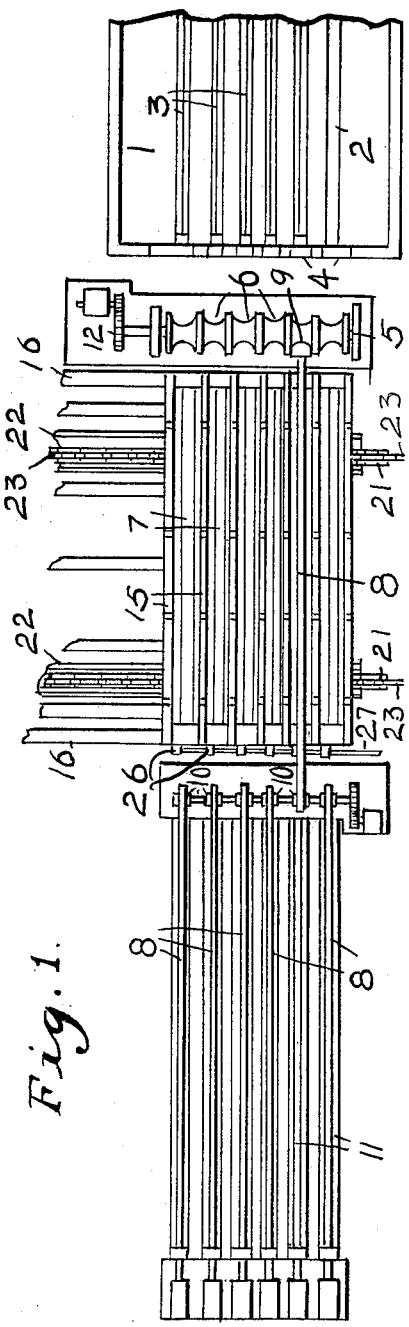

UNITED STATES PATENT OFFICE.

WILLIAM M. NECKERMAN, OF YOUNGSTOWN, OHIO, ASSIGNOR TO THE YOUNGSTOWN SHEET AND TUBE COMPANY, OF YOUNGSTOWN, OHIO, A CORPORATION OF OHIO.

PIPE-TRANSFERRING APPARATUS.

1,126,833.  Specification of Letters Patent.  Patented Feb. 2, 1915.

Original application filed November 1, 1913, Serial No. 798,683. Divided and this application filed April 2, 1914. Serial No. 829,129.

*To all whom it may concern:*

Be it known that I, WILLIAM M. NECKERMAN, a citizen of the United States, residing at Youngstown, in the county of Mahoning and State of Ohio, have invented new and useful Improvements in Pipe-Transferring Apparatus, of which the following is a specification.

My invention relates to apparatus for transferring pipes or similar articles transversely of their length.

It is the object of my invention to provide an apparatus for transferring pipes or similar bodies transversely of their length so that any one of a number of parallel pipes or similar bodies may be transferred without interfering with any of the pipes or similar bodies which lie in other positions.

My invention is primarily intended to constitute receiving troughs for lap weld tubes as they are discharged from a number of parallel heating positions in the lap weld furnace.

Also my invention is intended to combine with such receiving troughs means for conveying a pipe in any receiving trough transversely of its length, whether or not the other troughs contain pipes, or pipes are being discharged into the troughs.

Referring to the accompanying drawings, Figure 1 shows in plan a lap welding apparatus containing one form of my invention; and Fig. 2, a transverse vertical section taken longitudinally through one of the troughs 22.

On the drawings, 1 represents a welding furnace provided with the parallel gutters 2 for the skelp 3 which have been charged into the same from the right in any suitable manner.

4 represents the discharge openings in the furnace, through which the skelp are pushed by any suitable device or mechanism into the passes of the welding rolls 5. These rolls extend along in front of the openings 4 at right angles to the gutters 2 or skelp 3 in the furnace. I have shown the rolls 5 with a separate welding groove or pass 6 in line with each of the gutters 2 or skelp 3.

7 represents parallel welding troughs which lie directly back of the respective roll passes and in line with the same and the gutters 2 or skelp 3. The troughs lie slightly below the line of travel of the pipes over the mandrel bars 8, of which one is shown over the second trough from the observer, 9 representing the mandrel or pipe-ball thereon. The other mandrel bars are shown in their rearmost position, 10 representing diagrammatically the pullers for the said bars, the pullers equaling the number of bars which in turn preferably equal the number of welding troughs.

11 represents the bar puller troughs which equal the number of bar pullers.

In Fig. 2, I show the welding troughs on a larger scale in order that their structure may be better understood, the other views being on too small a scale to show the structure complete. Referring to this figure, 15 represents a number of parallel beams supported on the girders 16, which rest on the posts 17. The troughs proper, marked 7, are each composed of a fixed side or wall 18 secured to each beam 15 and a pivoted side or wall 19 pivoted to brackets on the adjacent beam. Each pair of walls 18 and 19 are parallel with the beams, their upper edges being separated to form the top of a welding trough 7. From their upper edges the sides 18 and 19 converge downwardly to a line above the top of the chain carrier or conveyer 21 for the pipes.

The carrier 21 is shown composed of endless chains having their upper portions supported by the troughs 22, extending transversely of the troughs 7. The carriers 21 are provided with outwardly projecting fingers 23.

To the lower edges of the sides 18 below the sides 19, I hinge the aprons or guide fingers 24, which guide the pipes 25 from the troughs 7 to the chain carrier when the pivoted trough-sides 19 are swung away from the fixed trough-sides 18, in the manner shown (at the right) on Fig. 2, where the trough-side 19 is swung away from its companion trough-side 18, and permits the pipe 25 to be directed to the carrier 21 by the guide 24 and into the path of the fingers 23 on the carrier. In the normal practice of the apparatus shown on Fig. 1, the skelp 3 are charged into the furnace 2 in regular order from one side thereof to the other until the gutters 2 are all occupied. When the first skelp charged is ready for welding, it is pushed out through the front of the furnace into the roll pass 6 in line therewith. The skelp is welded in the usual manner over a pipe ball 9 on the forward end of a mandrel bar 8. When the welded pipe has been finished, the mandrel bar is withdrawn from the pipe by the corresponding puller 10, the pipe then lying in the corresponding trough 7. The attendant by any suitable device or mechanism swings the trough-side 19 back as shown on Fig. 2 whereupon the pipe rolls down on the fingers 24 to the chain carrier 21, the fingers 23 of which engage the pipe and push it along beneath the pivoted guide fingers 24 lying in its path, the said fingers swinging up as shown on Fig. 2. The second skelp to be charged is pushed out of the furnace next and the operation described is repeated. The skelp are pushed from the furnace and welded in the same order in which they are charged into the furnace unless for any reason any particular skelp requires to remain longer in the furnace. Fresh skelp are charged into the furnace as soon as possible or practicable after the heated skelp are welded, the entire process being carried on as orderly and as rapidly as possible.

In the apparatus shown on Fig. 1, the process can be carried on with a minimum number of attendants and at a minimum expenditure of mechanical energy and any skelp in the furnace can be drawn when ready without waiting for the rolls to be positioned, or the mandrel-bars to be released from a previous operation and brought into position, or a welding trough to be brought into line or proper condition, or a pipe to be transferred across the welding trough. Every part of the apparatus is always ready under normal intelligent operation for welding any skelp whenever it is ready therefor.

The pivots or shafts which carry the trough sides 19 may be operated in various ways. I have shown on Fig. 2 these pivots or shafts provided with arms 26 having their free ends connected respectively to the horizontal operating rods 27, which rods may be operated by an attendant in any desired manner.

This application is a division of my application Serial Number 798,683 filed November 1, 1913.

I claim—

1. In a lap-welding apparatus, a plurality of parallel welding troughs, each constructed to discharge pipe beneath the same, and a conveyer having travel beneath the troughs and transversely thereof to receive the pipes as they are so discharged from the welding troughs.

2. In a lap-welding apparatus, a plurality of welding troughs, means for opening the bottoms of the troughs to discharge the pipes beneath the same, and a carrier having travel transversely of the troughs and arranged to receive the pipes as they are so discharged from the welding troughs.

3. In a lap-welding apparatus, a plurality of welding troughs, means for opening the bottoms of the troughs to discharge the pipes beneath the same, a carrier for the pipes below the troughs, and guides for directing the discharged pipes to the carrier, the guides lying in the path of the pipes on the carrier and pivoted so as to be swung out of the said path by engagement of the pipes therewith.

Signed at Youngstown, Ohio, this 28th day of March 1914.

WILLIAM M. NECKERMAN.

Witnesses:
E. T. McCLEARY,
W. T. LAWTHERS.

Copies of this patent may be obtained for five cents each, by addressing the "Commissioner of Patents, Washington, D. C."